Nov. 21, 1967  E. B. MYERS  3,354,343
DUAL BEAM ELECTRIC LAMP
Filed May 19, 1964  4 Sheets-Sheet 1

INVENTOR.
ELMAN B. MYERS
BY
Kenyon & Kenyon
ATTORNEYS

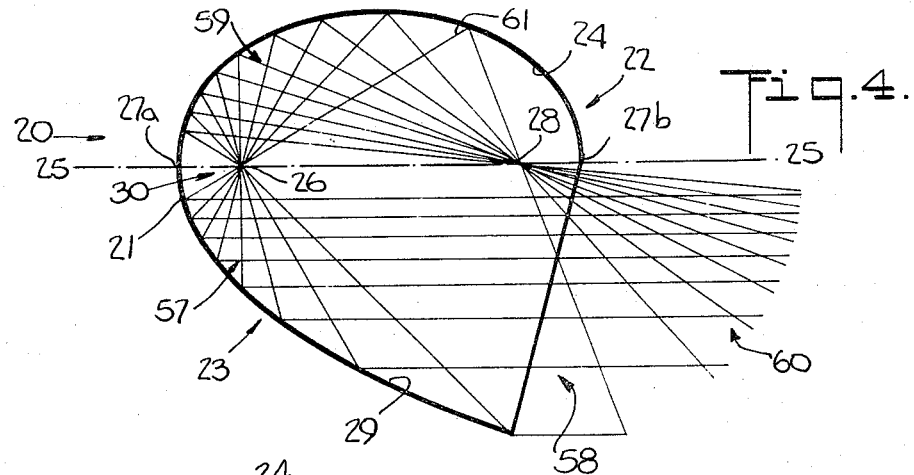
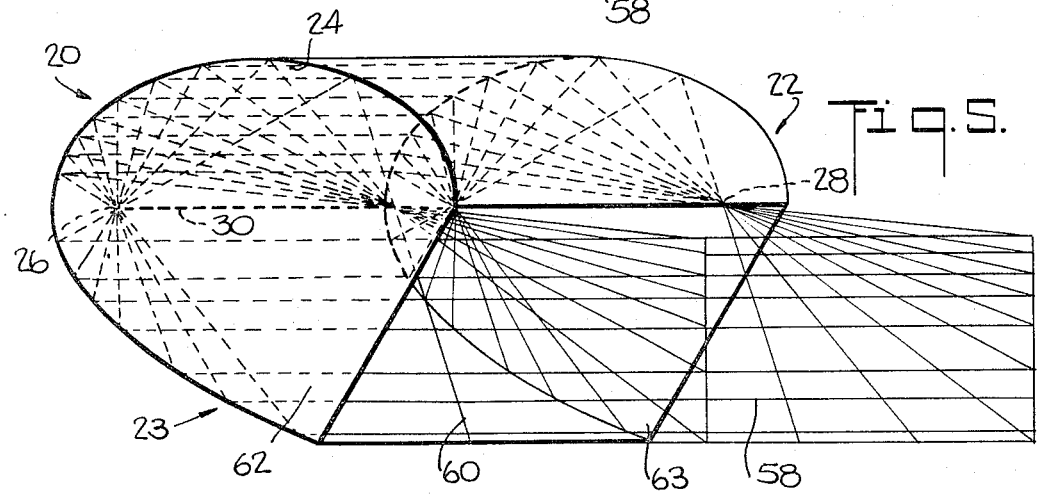
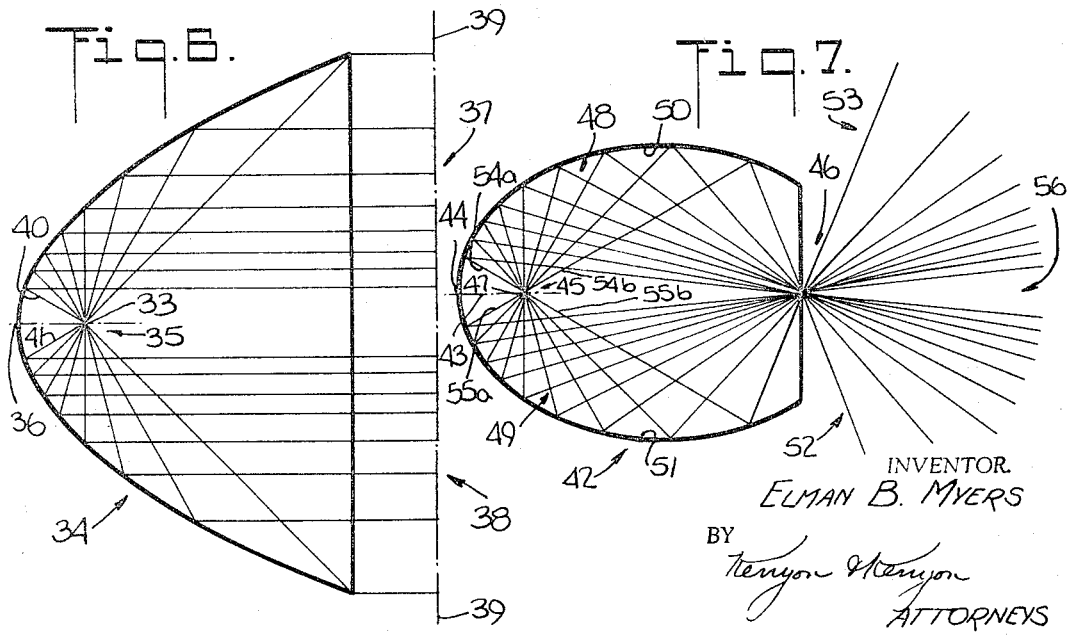

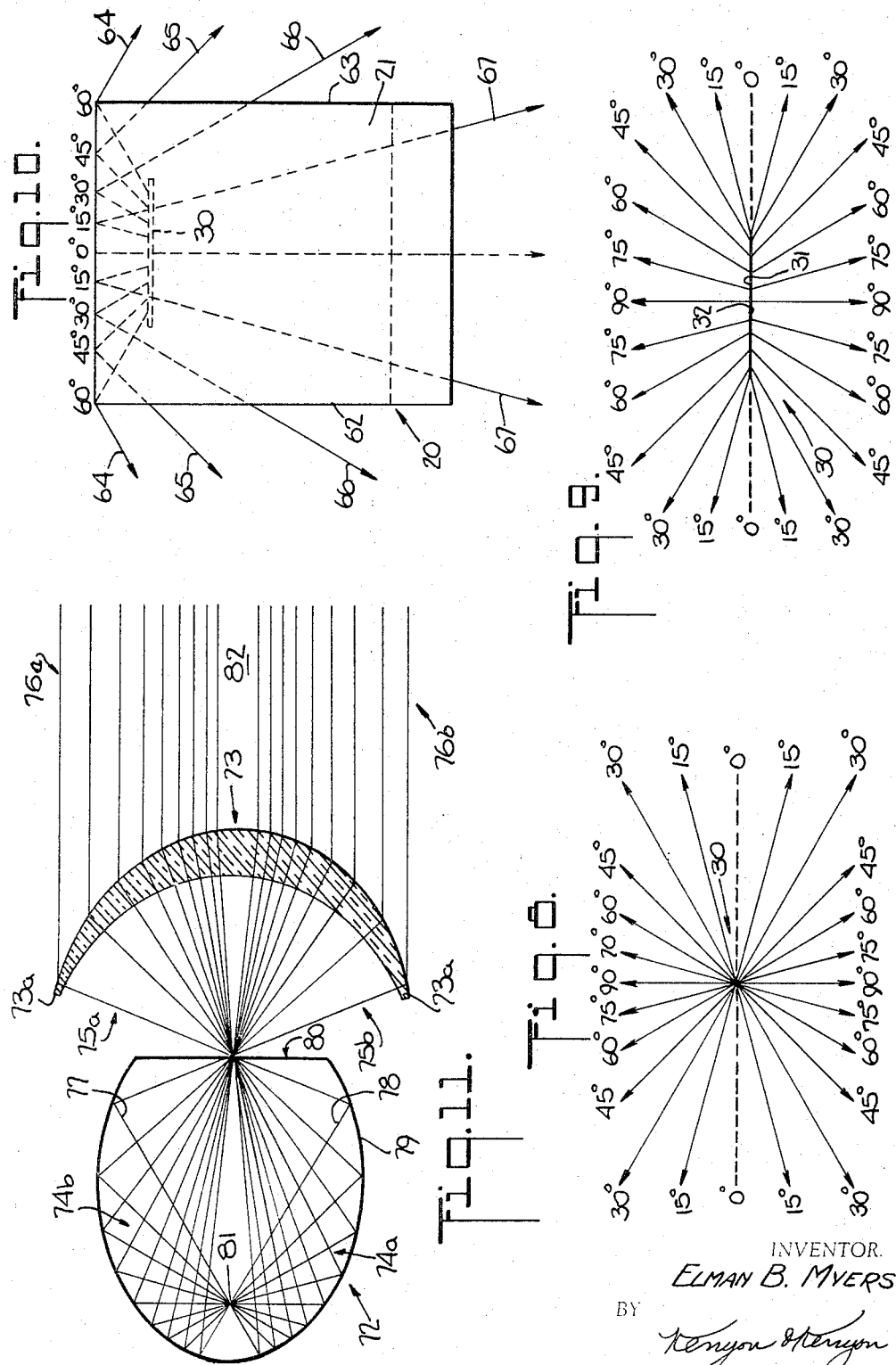

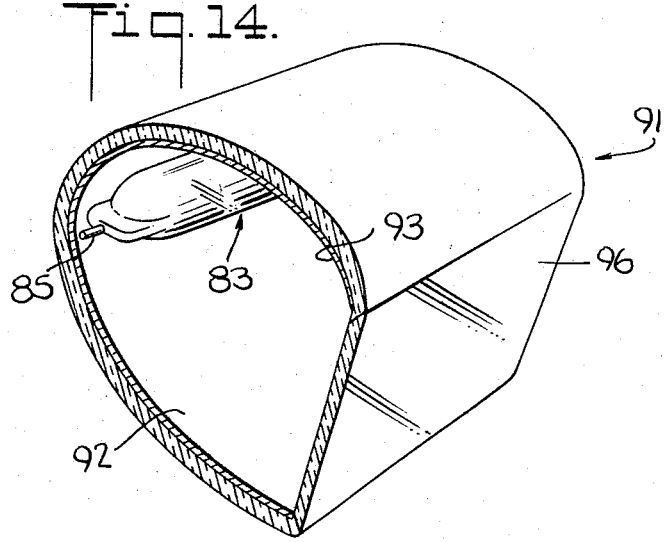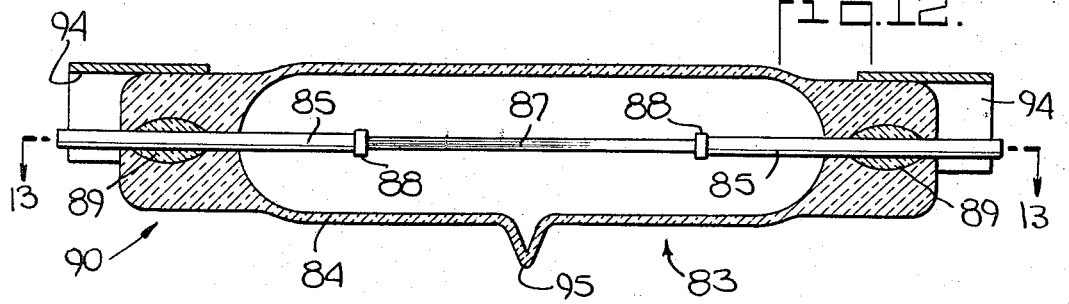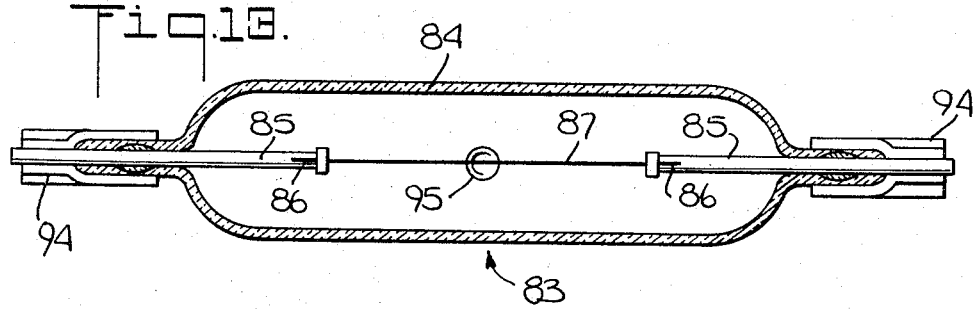

United States Patent Office 3,354,343
Patented Nov. 21, 1967

3,354,343
DUAL BEAM ELECTRIC LAMP
Elman B. Myers, Wayne, N.J., assignor to Elman B. Myers and Cecil R. Fuller, Spokane, Wash., a partnership
Filed May 19, 1964, Ser. No. 368,664
18 Claims. (Cl. 313—113)

This invention relates generally to electric lamps and more in particular to lamps having a reflector capable of reflecting dual beams of light.

One of the most common fields of use of electric lamps capable of projecting a beam of light is that of motor vehicle head lamps. An earlier significant advancement in the art of automobile head lamps was the introduction prior to World War II of the so-called "sealed-beam" head lamps. In the sealed beam lamp the mirror or reflector is made integral with the lens and the entire assembly is evacuated. In order to provide for both country and city driving conditions the sealed beam lamp is furnished with two filaments which emit either a high or low beam of light. Due to the long range projection of the upper or country beam, the driver of an approaching vehicle is subjected to a degree of blinding light even at an appreciable distance. During the approach of two vehicles, the drivers are supposed to switch over to the low or passing beam, although they often fail to do this. Upon switching, the low beam reduces the glare to an extent while the two vehicles are at a distance from one another, but as they approach the location where they pass one another, the drivers again are subjected to the dazzling and blinding effects of intense light.

With the advent of more powerful automobiles and better highways, the average operating speed of automobiles has increased and consequently automobiles have been provided with head lamp systems of increased candle power in order to increase the range of vision. Automobiles are now provided with separate lamps at each of two locations in order to provide for the high and low beams. With the current practice of four headlights for the country beam or even when merely two lamps are lighted for the passing beam, the approaching driver is subjected to an increased amount of light which more than ever interferes with his vision. Due to the mass of the filament, the parabolic mirror which is customarily used in head lamps is incapable of maintaining a precise beam of light with the result that the light diverges to a marked extent as it is projected from the lamp. Furthermore, the size of a conventional helical filament not only causes it to extend beyond the focal point of the parabolic mirror, but also to emit uncontrolled light in the forward direction. In recent years, the provision of a shield adjacent to the filament has served to trap a certain portion of the directly emitted light, but at the same time, interfered with the efficient utilization of this portion of the light produced by the filament.

In my U.S. Patent 3,037,139, issued May 29, 1962, there is shown a double image electric light projector in which the filament is in the form of a ribbon and the reflector is constituted by a portion of a concave cylindrical surface which is preferably parabolic in cross-section. With the ribbon filament disposed in a plane extending through the principal axis of the parabolic cross-section and along a line intersecting the focus of the parabolic cross-section, the lamp projects two beams of light each having a rectangular transverse cross-section. The two distinct beams thus produced can be directed below the line of vision of the driver of an approaching vehicle, so that the driver is not directly subjected to the intense beams of light. By positioning the length of the filament with respect to the focus in the direction of the principal axis of the parabolic cross-section, the two beams can be converged at an aiming point at a predetermined distance from the front of the vehicle.

The lamp of the cited patent is capable of providing bright illumination of the highway at a distance in front of the vehicle and with reduced glare for the approaching vehicle. However, since the two rectangular emitted beams are confined to illuminating the highway at a distance in front of the vehicle, there is a relatively reduced amount of light illuminating the highway adjacent to the front of the vehicle. The lighting of the highway directly adjacent to the forward portion of the vehicle can be an important factor in enabling the driver to observe approaching defects in the road, foreign objects on the road and the like. In addition, lighting immediately adjacent to the forward portion of the vehicle is of great value when turning the vehicle, since long range beams of light project into areas during a turn that are outside of the path of travel of the vehicle.

It is therefore one of the objects of the invention to provide a lamp capable of emitting dual beams of light.

It is another object of the invention to provide a lamp capable of emitting dual beams of light, each having a different characteristic.

It is still another object of the invention to provide a lamp capable of projecting a concentrated and a diverging beam of light.

It is an additional object of the invention to provide a dual beam vehicle head lamp which emits a reduced amount of glare to an oncoming vehicle.

It is a further object of the invention to provide a lamp for a vehicle which is capable of illuminating the region directly in front of as well as a distance from the forward portion of the vehicle.

It is also an object of the invention to provide a lamp capable of projecting local and distant beams of light with increased efficiency and reduction of glare.

In one embodiment of the invention, there is provided a lamp having a first reflecting surface with a cross-section substantially in the form of a portion of a first conic section. In addition, the lamp includes a second reflecting surface disposed adjacent to the first with a cross-section substantially in the form of a portion of a second conic section that is different from the first conic section. The two reflecting surfaces are disposed in a manner such that the focus of each of the conic sections is intersected by a common line. The lamp further includes a source of light disposed adjacent to the common line for directing light toward the reflecting surfaces. With this arrangement, each reflecting surface reflects a portion of the light from the source. By selecting the different conic sections, the characteristic of the beam of light reflected by each surface can be predetermined. Thus, for example, the long and short beams of light can be simultaneously projected.

In another embodiment of the invention, the source of light is a ribbon filament with each of its major surfaces directed toward a different one of the reflecting surfaces.

In still another embodiment of the invention, there is provided a lamp having reflecting surfaces which are each in the form of a portion of a concave cylinder with the cross-section of each cylinder which is perpendicular to the longitudinal axis thereof corresponding to a different conic section. Furthermore, the reflecting surfaces are disposed with the focus of the conic section of each of their respective cross-sections intersected by a common line. With this arrangement, each of the reflecting surfaces is adapted to project a beam of light which has a predetermined transverse cross-section.

In an additional embodiment of the invention, each of the reflecting surfaces is in the form of a portion of a concave cylindrical surface of which one cylindrical surface substantially corresponds to a portion of the conic section of an ellipse and the other cylindrical portion substantially corresponds to a portion of the conic section of a parabola.

In a further embodiment of the invention, the reflector of the lamp having a ribbon filament includes a portion which is substantially an envelope of one-half of an ellipse and a portion which is substantially an envelope of one-half of a parabola with the vertex of the parabola coincidental with one of the vertices of the ellipse and the foci of the two conic section coincidental.

In still a further embodiment of the invention, the ribbon filament lamp has a concave cylindrical form with a cross-section corresponding to a portion of an ellipse.

These and other objects and advantages of the invention will be more fully understood from the following description when taken with reference to the accompanying drawings in which:

FIG. 4 is a ray trace of the light emitted from the ribbon filament in one cross-section of the lamp of the invention having an elliptic-parabolic reflector.

FIG. 5 is a perspective view of the ray trace of the lamp of the invention having an elliptic-parabolic reflector.

FIG. 6 is a ray trace of light emitted from a ribbon filament in a cross-section of a lamp having a parabolic reflector.

FIG. 7 is a ray trace of light emitted from a ribbon filament in a cross-section of a lamp having an elliptic reflector.

FIG. 8 is a ray trace of the light emitted from the major surfaces of a ribbon filament when viewing the filament along its longitudinal axis.

FIG. 9 is a ray trace of the light emitted from a ribbon filament when viewing the filament perpendicular to its longitudinal axis and parallel to the plane of its major surfaces.

FIG. 10 is a plan view of the lamp of the invention of FIG. 1, showing a ray trace of the light projected therefrom.

FIG. 11 is a ray trace of the light emitted from a ribbon filament in a cross-section of a lamp having an elliptic reflector and a concave-convex lens.

FIG. 12 is a horizontal section view of a lamp bulb containing a ribbon filament.

FIG. 13 is a vertical section view of the ribbon filament lamp bulb.

FIG. 14 is a fragmentary perspective view of a lamp containing a ribbon filament bulb.

Figure 1:
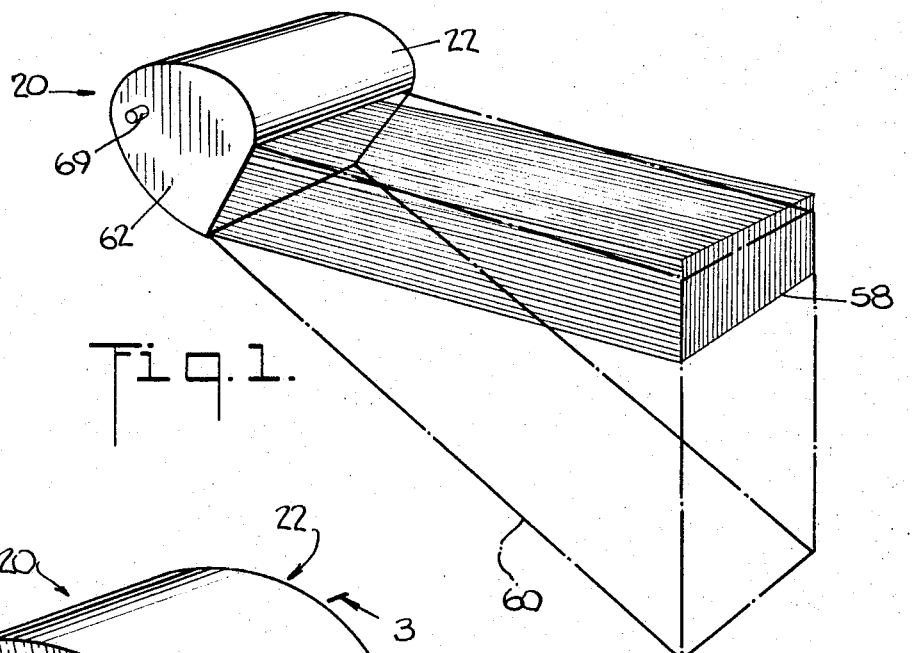
FIG. 1 is a perspective view of the lamp of the invention showing a portion of each of its dual beams of light.

Lamp 20 of the invention includes reflector 21 having a first or upper portion 22 and a second or lower portion 23. A cylindrical surface by definition is one generated by the movement of a straight line, the generatrix, which is constantly parallel to a reference straight line and constantly touches a fixed curve such as a conic section, the directrix, not in the plane of the fixed reference straight line. Reflecting surface 24 of the first portion is in the form of a portion of a concave cylindrical surface which is generated by the movement of a straight line along a portion of the curve of a conic section, such as an ellipse, while maintaining the straight line parallel to a reference axis such as focus 26 of the ellipse. As shown in FIG. 4, the ellipse is disposed adjacent to major or principal axis 25 so that vertices 27a and 27b as well as foci 26 and 28 are substantially disposed along the axis 25. FIG. 5 shows the envelope of one-half of an ellipse which surface 24 comprises.

Lower portion 23 of reflector 21 has an inner reflecting surface 29 which is in the form of a portion of another concave cylindrical surface. The cross-section of the lower portion which is perpendicular to the longitudinal axis of the concave cylindrical surface substantially corresponds to a conic section which is different than the conic section of the upper portion of the reflector. Thus in the lamp shown in FIG. 4, the lower portion corresponds to a parabola which has its vertex substantially coincidental with vertex 27a of the ellipse and its focus coincidental with focus 26. Thus, the elliptic portion and the parabolic portion of the reflector are symmetrically positioned with respect to a common principal axis 25.

As is known in optics, a ray emitted from one focus of an elliptic surface and striking the concave surface thereof is reflected through the other focus of the ellipse. The related phenomenon in an ellipsoidal (an ellipse of revolution) mirror is discussed in the text, "Physical Optics," by Robert W. Wood, The MacMillan Company, 3rd edition, 1934, at pages 45–47.

The phenomenon wherein a ray emitted from the focus of a parabola is reflected by the parabola along a line parallel to its principal axis is discussed in connection with a paraboloid (a parabola of revolution) mirror at pages 47–49 of the cited text.

Figure 2:
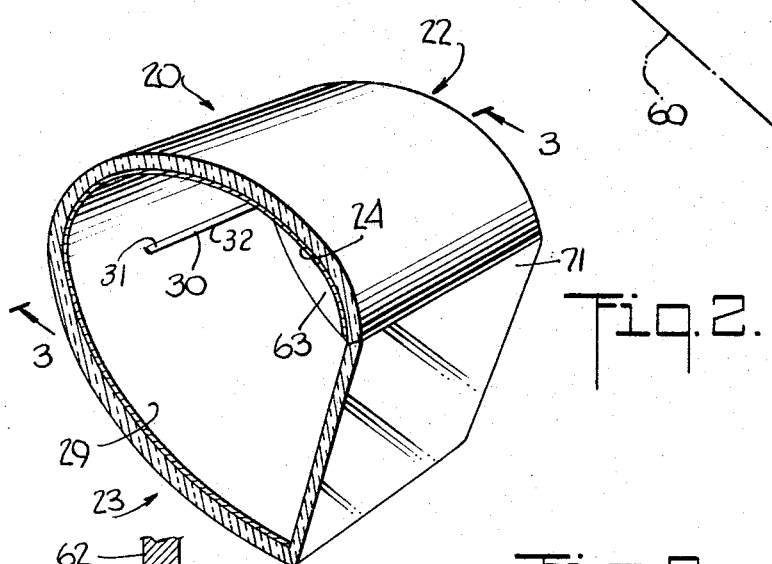
FIG. 2 is a fragmentary perspective view of the lamp of the invention showing the ribbon filament disposed therein adjacent to the elliptic-parabolic reflector.

The source of radiant energy or light for lamp 20 includes ribbon filament 30 (FIGS. 2 and 3) which can correspond to the type of ribbon filament disclosed in my U.S. Patent 3,037,139. Due to the small thickness of the filament, light is emitted substantially only from upper and lower or major surfaces 31 and 32, respectively, of the filament. The filament is mounted in lamp 20 with the upper and lower surfaces 31 and 32 (shown in FIG. 9) substantially parallel to a plane passing through vertex 27a and focus 26, that is parallel to axis 25. The filament extending along a line intersecting focus 26 is parallel to a line intersecting vertex 27a.

In FIG. 8, there is shown a ray trace of the radiant energy or light emitted from ribbon filament 30 when the major surfaces of the filament are disposed in a horizontal plane as viewed in the drawing. The ray trace is shown when viewed along the longitudinal axis of the filament. By way of example, the filament can be prepared from tungsten material and be proportioned to have a width of about $\frac{1}{16}$ of an inch and a thickness of about $\frac{1}{1000}$ of an inch. With such a thickness, it can be understood that the amount of light emitted along the edge, that is in a plane parallel to the upper and lower surfaces 31 and 32 of the filament shown in FIG. 9, is minimal and approaches zero. Consequently, in FIG. 8, the horizontal axis, marked zero degrees, shows no ray trace at either side of the filament. The ray trace of FIG. 8 shows that the useful amount of light emitted from each of the surfaces of the filament, that is the upper and lower surfaces, extends from the 90° position downwardly to an angle of about 15° from the surface of the filament. Thus it can be understood that along the length of the filament, there is a field of light emitted from one 15° angle to the other adjacent to each of the upper and lower surfaces of the filament.

FIG. 9 shows a ray trace of the light emitted from the filament when viewing the filament in a direction extending parallel to the plane of its upper and lower surfaces and at right angles to the length of the filament. Again it can be seen that below an angle of 15° that the light diminishes. Thus whether the filament is viewed along its longitudinal axis or at right angles to its longitudinal axis, the light is emitted at each of the upper and lower surfaces of the filament, within the bounds confined by the 15° positions extending from the edges of the filament along each of its surfaces and from the 15° positions extending from each of the ends of its length. Consequently, a solid field of light is emitted from each of the upper half and the lower half of the filament and each of the fields is substantially equal to the other.

FIG. 6 is a ray trace of the light emitted from ribbon filament 33 when mounted along the axis of focus of reflector 34 which is a portion of a cylindrical surface having a parabolic cross-section. This reflector corresponds to that shown in my U.S. Patent 3,037,139. As viewed in FIG. 6, the ribbon filament is disposed in a horizontal plane which passes through focus 35 and vertex 36. In accordance with my U.S. Patent 3,037,139, the provision of a ribbon filament in a cylindrical reflector having a parabolic cross-section, there is emitted two separate beams of light capable of forming separate images.

Beams 37 and 38 which form rectangular transverse patterns upon reference plane 39 are formed by the light reflected by reflector 34 from each of the opposite surfaces of the ribbon filament. Rays 40 and 41 substantially correspond to the 15° angle with respect to the plane extending through the focus and the vertex of the parabolic cross-section, beyond which the intensity of the light emitted from the filament is substantially diminished. As discussed in my cited patent, reflector 34 and filament 33 are capable of projecting long-range beams of light having substantially rectangular cross-sections. Further as discussed in my cited patent, beams 37 and 38 can be converged or diverged with respect to one another by the positioning of the ribbon filament with respect to the focus of the parabolic cross-section by moving the filament in a horizontal plane which extends through the focus and the vertex of the parabolic cross-section, that is along its principal axis. Thus, at a distance from the reflector and filament, beams 37 and 38 can be adjusted by the movement of the filament to provide either separate rectangular images displaced vertically with respect to one another or to overlie one another partially or completely.

Beams 37 and 38 due to othe substantially parallel nature of the rays of the beams are best suited for illumination of an area at an appreciable distance from the reflector. Under such a condition, it can be understood that while distant areas may be brightly illuminated, areas in front of the lamp and substantially adjacent to it do not receive any appreciable portion of the light emitted from reflector 34.

FIG. 7 shows reflector 42 of the invention which is a portion of a concave cylindrical surface having an elliptic cross-section. The elliptic cross-section which extends about major axis 43 includes vertex 44 and foci 45 and 46. As shown in FIG. 7, reflector 42 is terminated along a plane which is substantially at right angles to axis 43 and which intersects focus 46. As shown in FIG. 6 reflector 34 having a parabolic cross-section reflects the spherical wave front emitted from ribbon filament 32 as two beams of light, 37 and 38, each having a plane wave front. As opposed to this, reflector 42 of the invention having an elliptic cross-section reflects the spherical wave front emitted from focus 45 as a spherical wave. In FIG. 7, ribbon 47 is positioned with its upper and lower surfaces parallel to a plane extending through vertex 44 and foci 45 and 46. Consequently, ribbon filament 47 emits two spherical wave fronts 48 and 49 toward the surface of reflector 42. Upon reflection from each of half surfaces 50 and 51, the rays are reflected in a form of a spherical wave front which converges at the line extending through focus 46. Beyond reflector 42 and beyond focus 46, fronts 48 and 49 diverge as beams 52 and 53, respectively. Thus, the cylindrical reflector 42 having an elliptic cross-section and provided with ribbon filament 47, emits beams 52 and 53 which fan outwardly with a wedge-shaped form.

Cylindrical reflector 42 having an elliptic cross-section and provided with ribbon filament 47 disposed along a line intersecting the focus of the cross-section can serve as a flood light since it emits divergent beams 52 and 53. As shown in FIG. 7, rays 54a and b and 55a and b substantially correspond to the rays at 15° as shown in FIG. 8 by the ray trace. Since rays at angles to the horizontal which are less than those of rays 54a and 55b are of diminished intensity, these rays need not be reflected by surfaces 50 and 51 of the reflector. Consequently, the reflector need only extend from vertex 44 along the curve of the ellipse to a location that is sufficiently advanced with respect to focus 45 to intercept rays 54b and 55b.

With the ribbon filament disposed along the line passing through focus 45 and with the light emitted therefrom being of diminished intensity below the 15° rays, beams 52 and 53 are emitted with a band of reduced intensity or a dark band 56 disposed therebetween (FIG. 7). Adjustment of ribbon filament 47 along the horizontal plane extending through foci 45 and 46 and vertex 44, while maintaining the axis of the filament parallel to that of the focus 45, can serve to position beams 52 and 53 either closer together or further removed from one another so that band 56 can be reduced and substantially eliminated or increased in size.

In lamp 20, the preferred embodiment of the invention, first and second portions 22 and 23 of reflector 21 comprise half envelopes of reflectors corresponding to those of FIGS. 6 and 7, namely reflectors 34 and 42. Thus, first portion 22 has a cross-section substantially in the form of one-half of an ellipse extending from vertex 27a to vertex 27b which are disposed along the major axis of the ellipse. The second or lower portion of reflector 21 which corresponds to a half envelope of a reflector 34 in FIG. 6 has a cross-section which corresponds to one-half of the parabola. First and second portions 22 and 23 are proportioned to have their vertices coincident when their foci are coincident with the line of focus designated 26 in FIG. 4. Thus, the half envelope of the ellipse and the parabola, by virtue of the common focus and vertex arrangement, intersect one another at the vertex and form a continuous curved plane, the cross-section of each portion of which is of two different conic sections, that is a parabola and an ellipse.

FIGS. 4 and 5 show the ray trace that results from disposing ribbon filament 30 along a line extending through common focus 26 of the half envelope of the parabola and the half envelope of the ellipse. Thus, wave front 57 is reflected by surface 29 in a manner similar to that discussed with respect to reflector 34 in FIG. 6. As a result, after reflection, wave front 57 is emitted as horizontal beam 58 having rays extending substantially parallel to one another. Wave front 59 is reflected by surface 24 in a manner similar to that discussed with respect to reflector 42 in FIG. 7. Consequently, wave front 59 is emitted beyond the line passing through focus 28 as divergent or wedge-shaped beam 60 advancing in a downward direction as viewed in the drawing.

Therefore lamp 20 is capable of emitting two beams, 58 and 60, which have totally different characteristics. The horizontally extending parallel beam 58 which forms a rectangular image extending at right angles to its rays is capable of producing illumination or forming an image at a distance from the front portion of the lamp. On the other hand, divergent and downwardly extending beam 60 is capable of providing illumination or forming an image adjacent to the front portion of the lamp. FIG. 1 illustrates a portion of the two beams disposed between two vertical planes as viewed in the drawing and demonstrates that lamp 20 is well suited to serve as a motor vehicle head lamp since beam 58 is adapted to illuminate the highway at a distance in front of the lamp while beam 60 can illuminate the highway directly in front of the lamp and in regions adjacent thereto.

Again as previously discussed, by positioning of ribbon filament 30 along a plane passing through axis 25 and intersecting focus 26 and vertices 27a and b, beams 58 and 60 can be moved with respect to one another thus enabling a specific angular relationship of the beams to be predetermined.

As shown in FIG. 4, upper portion 22 of reflector 21 is extended substantially beyond the portion of surface 24 where ray 61 is reflected. Thus surface 24 in cross-section is substantially a full one-half of an ellipse. Even though rays are emitted from the filament beyond the 15° ray corresponding to ray 61, the reflection of rays extending to but not beyond ray 61 is sufficient to reflect the major portion of the light emitted toward reflector 24. Therefore, the primary function of surface 24 beyond ray 61 and extending up to vertex 27b, is to block the view of an observer looking toward focus 26 of the lamp from beyond vertex 27b. Thus, this portion of surface 24 is basically one of a shield, rather than a reflector. Since beam 58 extends in substantially a horizontal direction when lamp 20 is mounted in the conventional position at the front portion of the vehicle, that is substantially below the height of the windshield of a conventional vehicle, beam 58 is below the line of sight of the driver of an approaching vehicle. Therefore, the driver of an approaching vehicle does not experience glare or dazzling light from beam 58.

By way of example, the horizontal plane of lamp 20 extending through axis 25 can be positioned in a motor vehicle installation at a distance of about 20 to 27 inches above the ground level. Since the horizontal line of sight of the driver of an approaching vehicle is at a distance of about 40 to 48 inches above the ground, the line of sight of the approaching driver is above that of horizontal beam 58. Even though an approaching driver can see half-parabolic surface 29 of the lamp, the beam reflected therefrom is not directed toward the line of sight of the approaching driver. In addition, the forward portion of surface 24 of upper portion 22 of the reflector blocks the line of sight of the approaching driver from observing ribbon filament 30 extending along the line of focus 28 of the lamp. Consequently the approaching driver is not in the path of beam 60, nor in the path of any unreflected rays from filament 30.

As shown in the ray trace of FIG. 9, certain of the rays extend at relatively low angles with respect to the horizontal plane through which the upper and lower surfaces of the filament are parallel. These rays cause the light reflected from reflector 23 to diverge in the horizontal plane as shown in FIG. 10. If the end surfaces or plates 62 and 63 which close the ends of the lamp and are disposed at right angles to the surfaces of the reflector are of translucent material, such as glass, rays 64–66 are emitted from the lamp (FIG. 10). Thus, both beams 58 and 60 can be conditioned to be substantially divergent when viewed in the horizontal plane as in FIG. 10. However, where it is desired to limit the divergent angle of the beams when viewed in the horizontal plane, end 62 and 63 can be made from opaque material suitable to block rays 64–66. In such a case, the outermost rays of beams 58 and 60 would be those substantially adjacent to rays 67 shown in FIG. 10.

The divergency of beam 60 in the horizontal direction can be especially advantageous in illuminating regions not only directly in front of the lamp but to each side of it and in a substantially uniform manner. Therefore in the case of a motor vehicle head lamp installation, the highway is illuminated directly in front of the vehicle by beam 60 as well as to either side of it. A further advantage of this characteristic of beam 60 is that it illuminates the side portions of the highway, such as the shoulders, which become the forward portion whenever the vehicle is experiencing a turn of any appreciable radius. Consequently, the divergency of beam 60 serves to maintain the highway illuminated directly in front of the vehicle even though horizontal beam 58 is projected beyond the highway during a turning condition.

Reflectors 23 and 22 can be fabricated from glass by the "dropping" process in which a plate of glass is placed upon a suitable mold or die and heated until it softens and conforms to the shape of the mold or die. In such a case, the reflecting surface, that is the concave surface, is provided with a suitable coating to form a first surface mirror.

However, due to the complexity of accurately forming a reflector whose cross-section comprises, for example, two different conic sections, it is preferred in accordance with the method of the invention, to form the reflector by the "stretch-wrap" forming of metal about a mandrel which corresponds to the cross-section of the inner surface of the reflector. By way of example, the reflector can be fabricated from vacuum-melted stainless steel, such as type 304, having a gauge of about .030 inch. The mandrel for the stretch-wrap forming process is prepared from hard material, such as a carbide alloy, and is provided with an extremely fine surface finish, such as in the range of about one micro-inch. After the stretch-wrap forming operation, in which the sheet of stainless steel is drawn or cold-formed about the mandrel, to a point at which the material passes beyond its yield point, the material permanently conforms to the shape of the mandrel. During the process, the fact that the material has been taken beyond its yield point and as a result of the sliding of the metal with respect to the highly polished mandrel surface, the concave surface of the reflector can have a surface finish which is of a higher degree than that of the mandrel, such as in the range of ½ micro-inch.

The reflector, so formed, can then be coated with aluminum by the metal evaporation process in order to provide a thin overlay of aluminum which increases the reflective property of the reflector. In order to protect the aluminum coating from oxidation and to increase its reflective property, an overlay of approximately ¼ wave length thickness of silicon monoxide is applied to the aluminum surface.

Figure 3:
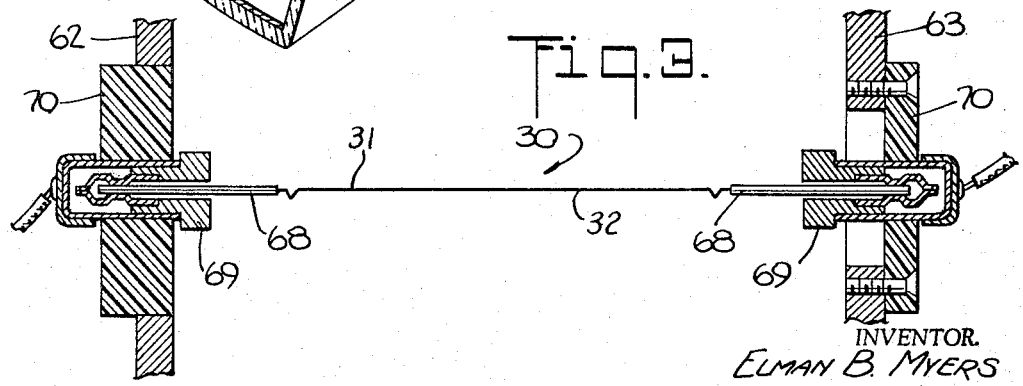
FIG. 3 is an enlarged fragmentary vertical section view taken along the line 3—3 in FIG. 2 and showing the ribbon filament and the means for mounting it within the lamp.

As shown in FIG. 3, the ends of ribbon filament 30 are mounted in supports 68 which are provided with terminals 69. The terminals are supported by plates 70 of insulating material which are sealed to end plates 62 and 63 of the lamp. Window 71 of lamp 20 (FIG. 2) can be of heat-resistant glass material such as Pyrex glass. Since the reflecting surface is in the form of a first surface mirror, it is capable of reflecting radiant heat as well as visible light, and therefore, the window can be subjected to an elevated temperature condition.

The metal-to-glass seal between the reflector and the window can be prepared in accordance with the improved glass sealing technique disclosed in my U.S. Patent 2,901,654 issued Aug. 25, 1959.

In the preferred form of the invention, as shown in lamp 20, ribbon filament 30 extends across the interior of the lamp from one end plate to the other. Consequently, in the final stages of fabrication, the interior of the lamp is evacuated and may be provided with an inert gas atmosphere in accordance with standard incandescent lamp construction.

In order to provide for adjustable positioning of the filament, with respect to the line of focus in order to selectively control the angular relationship of the two beams emitted from the lamp with respect to one another, the adjustable filament mounting arrangement shown in my U.S. Patent 2,901,654, issued Aug. 25, 1959, can be employed.

In a further embodiment of the invention, lamp 72 substantially corresponding to the filament and reflector construction shown in FIG. 7, can be employed in conjunction with concave-convex lens 73 which is capable of refracting divergent beams 75a and b, that is fan or wedge-shaped envelopes of light, into parallel beams 76a and b, respectively (FIG. 11). Here again, the 15° rays, such as rays 77 and 78, determine not only the extent of the portion of reflector 79 adjacent to opening 80, but also the extent of the peripheral portions 73a of lens 73. Again, the adjustment of the position of ribbon filament 81 with respect to the line of focus of reflector 79 serves to control the magnitude of dark band 82 disposed between beams 75 and 76.

In installations where it is desired to be able to replace merely a lamp bulb upon failure rather than replacing the entire lamp assembly as in the case of a sealed-beam lamp, the ribbon filament, as shown in my U.S. Patent 3,037,139 can be provided in a separate tubular glass lamp bulb. With such an arrangement, the lamp is adapted to be opened for bulb replacement. Thus, only the separate bulb is evacuated. With such an assembly, it is necessary to provide the tubular envelope with a substantially small outside diameter in order that the ribbon filament can be disposed along the line of focus of the two conic sections without the tubular envelope contacting or interfering with the inner surface of the reflector.

In FIGS. 12 and 13 there is shown lamp bulb 83 which is adapted to be used with the various reflectors of the invention. Bulb 83 includes tubular envelope 84 which is fabricated from temperature-resistant glass such as Vycor glass which is about 96% silicon dioxide. The bulb is provided with tungsten lead wires 85 which contain slits 86 for receiving and retaining ribbon tungsten filament 87. By way of example, the filament can have a thickness of .0005 to about .001 inch and a width of about .0625 inch. Such a filament has a surface area to volume ratio which is much greater than a round wire of the same volume having a desired resistance length for an equal wattage input. In order to retain filament 87 in slits 86, the filament is welded at locations 88 to lead wires 85 adjacent to the slits. The welds can be made in a controlled atmosphere and can be located on both sides of the slitted lead wires.

Prior to assembly into the bulb, lead wires 85 are provided with beads 89 of temperature-resistant glass such as Pyrex glass No. 7230. Envelope 84 is sealed at each of its end portions with respect to beads 89 and lead wires 85 by a seal press 90 which is formed by the squeezing action of metal jaws while the glass is in a softened state. When the press solidifies, it is in the flared shape shown in the drawings.

Bulb 83 is adapted to be mounted in lamp 91 (FIG. 14) along the line of focus of parabolic portion 92 and elliptic portion 93. The bulb is accurately supported in position with respect to the common line of focus of the reflector by means of clips 94 which can be fabricated from hardened copper. Each of the clips is shaped to engage not only the exposed end portions of the lead wire, but also the external surface of the seal press. Thus by forming the clips with a U-shaped section similar to that used in fuse clips, the bulb can be snapped into the engagement therewith and positioned in both the longitudinal and transverse directions. In this way, it is insured that the ribbon filament is maintained along the common line of focus during operation and whenever the bulb is changed.

Although envelope 84 can be manufactured from Pyrex glass, such an envelope cannot withstand the high level of bulb temperature which a Vycor envelope can withstand when a very high filament temperature is employed. Thus the Vycor envelope enables the ribbon filament temperature to be operated at an extremely high level such as in the range of 2500° C. and thereby increase the level of luminous efficiency of the bulb.

During manufacture of the lamp, envelope 84 is evacuated by means of exhaust tip off 95. Prior to sealing the tip off, the envelope can be provided with an inert gas atmosphere such as one of the rare gases of argon or xenon. In order to retard the evaporation of the tungsten filament when operated at the high temperature levels such as in the range of 2500° C. or higher, the envelope can be provided with a level of iodine vapor in addition to the rare gas. Lamps containing an iodine vapor atmosphere for a very high temperature operation of the filament are shown in U.S. Patent 1,267,888, issued May 28, 1918 and U.S. Patent 2,883,571, issued April 21, 1959. In a similar manner, lamps 20 and 42 in which the entire lamp is evacuated can be provided with an iodine and rare gas atmosphere in order to enable the filament to operate at a much higher temperature.

Lamp 91 is provided with window 96 of temperature-resistant glass such as Pyrex glass. In order to increase the transmissability of the window, each side of the window is provided with an evaporative coating of magnesium fluoride. Such a coating as is known in the optics art can reduce the loss due to reflection which occurs at each side of a window and which can run as high as 7% at each side. In this way the transmissability of the window can be brought into the range of about 98% to 99%.

In addition to the use of the ribbon filament and the ribbon filament bulbs in the lamps of the invention as the elongated source of light, a gas-filled arc discharge lamp bulb can be employed. In this case, the envelope of the bulb is reduced in diameter from that shown in the drawings and is in the form of a capillary tubular envelope which can be fabricated similarly as envelope 84 from Vycor glass or quartz material. The capillary tubular envelope contains an atmosphere of a rare gas such as xenon. Upon applying sufficient voltage to the bulb to cause an arc discharge through the gas, a bright level of light in a linear form is emitted along the length of the bulb. Such an elongated or linear source of light is capable of emitting rays toward the two reflector portions of the various reflectors of the invention in a manner related to that of the ribbon filament.

Normally due to the geometry of a reflecting system, it is not possible to intercept the entire emission of light from a filament for projection by reflection, however, it should be noted that the upper portion 22 of reflector 21 (FIG. 4), due to its cross-section of a half of an ellipse, can intercept and project about 165° of the vertical spherical wave front from the upper surface of the ribbon filament since the portion of the surface adjacent to vertex 27b can intercept rays extending down to the horizontal or zero angle position. At the same time, upper portion 22 can intercept and reflect about 150° of the horizontal wave front, as shown by the ray trace of FIG. 9. Lower portion 23 having a cross-section corresponding to a half of a parabola can intercept about 130° of the vertical spherical wave front from the bottom surface of the ribbon filament and about 150° of the horizontal spherical wave front. Consequently a major part of the luminous energy emitted by the ribbon filament can be reflected and projected in two beams by lamp 20 of the invention. As a result the lamp of the invention in the embodiment of lamp 20 is not only capable of utilizing an extremely high fraction of all the luminous energy emitted by the ribbon filament, but can also project it in the form of beams which are capable of illuminating both local and distant areas in front of the lamp without producing objectionable glare or dazzling brilliance to an observer facing the lamp.

In a related manner, lamps employing the reflector and ribbon filament arrangement shown in FIG. 7 are capable of utilizing a very large fraction of the available luminous energy, either to form the floodlight effect shown in FIG. 7 or in producing the concentrated beam shown in FIG. 11.

While certain embodiments of the invention have been shown and described herein, it is to be understood that substitutions and additions may be made without departing from the scope and spirit of the invention.

What is claimed:

1. A lamp comprising a first reflecting surface having a cross-section throughout the length thereof substantially in the form of a portion of a first conic section, a second reflecting surface disposed adjacent to said first reflecting surface and having a cross-section throughout the length thereof substantially in the form of a portion of a second conic section which is different from the first conic section, said first and second reflecting surfaces being disposed with the focus of the conic section of each of their respective cross-sections intersected by a common line, and a source of light disposed adjacent to the common line for directing light toward said first and second reflecting surfaces whereby each of said first and second reflecting surfaces are adapted to reflect a separate portion of the light from said source.

2. A lamp comprising a first reflecting surface having a cross-section throughout the length thereof substantially in the form of a portion of a first conic section, a second reflecting surface disposed adjacent to said first reflecting surface and having a cross-section throughout the length thereof substantially in the form of a portion of a second conic section which is different from the first conic section, said first and second reflecting surfaces being disposed with the focus of the conic section of each of their respective cross-sections intersected by a common line, and an elongated source of light disposed with the length thereof adjacent to the common line for directing light toward said first and second reflecting surfaces whereby each of said first and second reflecting surfaces are adapted to reflect a separate portion of the light from said source.

3. A lamp comprising a first reflecting surface having a cross-section throughout the length thereof substantially in the form of a portion of a first conic section, a second reflecting surface disposed adjacent to said first reflecting surface and having a cross-section throughout the length thereof substantially in the form of a portion of a second conic section which is different from the first conic section, said first and second reflecting surfaces being disposed with the focus of the conic section of each of their respective cross-sections intersected by a common line, and a ribbon-shaped source of light for emitting light from the opposite surfaces thereof, said source of light being disposed adjacent to the common line with each of said opposite surfaces positioned to direct light toward a different one of said first and second reflecting surfaces, whereby each of said first and second reflecting surfaces are adapted to reflect a separate portion of the light from said source.

4. A lamp comprising a first reflecting surface having a cross-section throughout the length thereof substantially in the form of a portion of a first conic section, a second reflecting surface disposed adjacent to said first reflecting surface and having a cross-section throughout the length thereof substantially in the form of a portion of a second conic section which is different from the first conic section, said first and second reflecting surfaces being disposed with the focus of the conic section of each of their respective cross-sections intersected by a common line and a vertex of the conic sections adjacent said focus of each of their respective conic sections intersected by an additional common line, and a ribbon-shaped source of light for emitting light from the opposite surfaces thereof, said source of light being disposed adjacent to the common line with each of said opposite surfaces positioned to direct light toward a different one of said first and second reflecting surfaces whereby each of said first and second reflecting surfaces are adapted to reflect a separate portion of the light from said source.

5. A lamp comprising a first reflecting surface having a cross-section throughout the length thereof substantially in the form of a portion of a first conic section, a second reflecting surface disposed adjacent to said first reflecting surface and having a cross-section throughout the length thereof substantially in the form of a portion of a second conic section which is different from the first conic section, at least one of said conic sections being an ellipse, said first and second reflecting surfaces being disposed with the focus of the conic section of each of their respective cross-sections intersected by a common line, and a source of light disposed adjacent to the common line for directing light toward said first and second reflecting surfaces whereby each of said first and second reflecting surfaces are adapted to reflect a separate portion of the light from said source.

6. A lamp comprising a first reflecting surface having a cross-section throughout the length thereof substantially in the form of a portion of a first conic section, a second reflecting surface disposed adjacent to said first reflecting surface and having a cross-section throughout the length thereof substantially in the form of a portion of a second conic section which is different from the first conic section, at least one of said conic sections being an ellipse, said first and second reflecting surfaces being disposed with the focus of the conic section of each of their respective cross-sections intersected by a common line and a vertex of the conic sections adjacent said focus of each of their respective conic sections intersected by an additional common line, and a ribbon-shaped source of light for emitting light from the opposite surfaces thereof, said source of light being disposed adjacent to the common line with each of said oppoiste surfaces positioned to direct light toward a different one of said first and second reflecting surfaces whereby each of said first and second reflecting surfaces are adapted to reflect a separate portion of the light from said source.

7. A lamp comprising a first reflecting surface having a cross-section throughout the length thereof substantially in the form of a portion of a first conic section, a second reflecting surface disposed adjacent to said first reflecting surface and having a cross-section throughout the length thereof substantially in the form of a portion of a second conic section which is different from the first conic section, at least one of said conic sections being a parabola, said first and second reflecting surfaces being disposed with the focus of the conic section of each of their respective cross-sections intersected by a common line and a vertex of the conic sections adjacent said focus of each of their respective conic sections intersected by an additional common line, and a ribbon-shaped source of light for emitting light from the opposite surfaces thereof, said source of light being disposed adjacent to the common line with each of said opposite surfaces positioned to direct light toward a different one of said first and second reflecting surfaces whereby each of said first and second reflecting surfaces are adapted to reflect a separate portion of the light from said source.

8. A lamp comprising a first reflecting surface having a cross-section throughout the length thereof substantially in the form of a portion of an elliptic conic section, a second reflecting surface disposed adjacent to said first reflecting surface and having a cross-section throughout the length thereof substantially in the form of a portion of a parabolic conic section, said first and second reflecting surfaces being disposed with the focus of the conic section of each of their respective cross-sections intersected by a common line and a vertex of the conic sections adjacent said focus of each of their respective conic sections intersected by an additional common line, and a ribbon-shaped source of light for emitting light from the opposite surfaces thereof, said source of light being disposed adjacent to the common line with each of said opposite surfaces positioned to direct light toward a different one of said first and second reflecting surfaces whereby each of said first and second reflecting surfaces are adapted to reflect a separate portion of the light from said source.

9. A lamp comprising a first reflecting surface which is in the form of a portion of a first concave cylindrical surface, the cross-section of said first reflecting surface perpendicular to the longitudinal axis of the first concave cylindrical surface substantially corresponding to a portion of a first conic section, a second reflecting surface disposed adjacent to said first reflecting surface and being in the form of a portion of a second concave cylindrical surface, the cross-section of said second reflecting surface perpendicular to the longitudinal axis of the second concave cylindrical surface substantially corresponding to a second conic section which is different from the first conic section, said first and said second reflecting surfaces being disposed with the focus of the conic section of each of their respective cross-sections intersected by a common line substantially parallel to the axes of said cylindrical surfaces, and a source of light disposed adjacent to the common line for directing light toward said first and second reflecting surfaces, whereby each of said first and second reflecting surfaces are adapted to reflect a separate portion of the light from said source.

10. A lamp comprising a first reflecting surface which is in the form of a portion of a first concave cylindrical surface, the cross-section of said first reflecting surface perpendicular to the longitudinal axis of the first concave cylindrical surface substantially corresponding to a portion of a first conic section, a second reflecting surface disposed adjacent to said first reflecting surface and being in the form of a portion of a second concave cylindrical surface, the cross-section of said second reflecting surface perpendicular to the longitudinal axis of the second concave cylindrical surface, substantially corresponding to a second conic section which is different from the first conic section, said first and said second reflecting surfaces being disposed with the focus of the conic section of their respective cross-sections intersected by a common line substantially parallel to the axes of said cylindrical surfaces, and an elongated source of light disposed adjacent to the common line for directing light toward said first and second reflecting surfaces, whereby each of said first and second reflecting surfaces are adapted to reflect a separate portion of the light from said source.

11. A lamp comprising a first reflecting surface which is in the form of a portion of a first concave cylindrical surface, the cross-section of said first reflecting surface perpendicular to the longitudinal axis of the first concave cylindrical surface, substantially corresponding to a portion of a first conic section, a second reflecting surface disposed adjacent to said first reflecting surface and said second reflecting surface being in the form of a portion of a portion of a second concave cylindrical surface, the cross-section of said reflecting surface perpendicular to the longitudinal axis of the second concave cylindrical surface, substantially corresponding to a second conic section which is different from the first conic section, said first and said second reflecting surfaces being disposed with the focus of the conic section of each of their respective cross-sections intersected by a common line substantially parallel to the axes of said cylindrical surfaces, and a ribbon-shaped source of light for emitting light from the opposite surfaces thereof, said source of light being disposed adjacent to the common line with each of said opposite surfaces positioned to direct light toward said first and second reflecting surfaces, whereby each of said first and second reflecting surfaces are adapted to reflect a separate portion of the light from said source.

12. A lamp comprising a first reflecting surface which is in the form of a portion of a first concave cylindrical surface, the cross-section of said first reflecting surface perpendicular to the longitudinal axis of the first concave cylindrical surface substantially corresponding to a portion of a first conic section, a second reflecting surface disposed adjacent to said first reflecting surface and being in the form of a portion of a second concave cylindrical surface, the cross-section of said second reflecting surface perpendicular to the longitudinal axis of the second concave cylindrical surface substantially corresponding to a second conic section which is different from the first conic section, said first and said second reflecting surfaces being disposed with the focus of the conic section of each of their respective cross-sections intersected by a common line substantially parallel to the axes of said cylindrical surfaces and with a vertex of the conic section adjacent said focus of each of their respective conic sections intersected by an additional common line substantially parallel to the axes of said cylindrical surfaces, and a ribbon-shaped source of light for emitting light from the opposite surfaces thereof, said source of light being disposed adjacent to the common line with each of said opposite surfaces positioned to direct light toward said first and second reflecting surfaces, whereby each of said first and second reflecting surfaces are adapted to reflect a separate portion of the light from said source.

13. A lamp comprising a first reflecting surface which is in the form of a portion of a first concave cylindrical surface, the cross-section of said first reflecting surface perpendicular to the longitudinal axis of the first concave cylindrical surface substantially corresponding to a portion of a first conic section, a second reflecting surface disposed adjacent to said first reflecting surface and being in the form of a portion of a second concave cylindrical surface, the cross-section of said second reflecting surface perpendicular to the longitudinal axis of the second concave cylindrical surface substantially corresponding to a second conic section, at least one of said conic sections being an ellipse, said first and said second reflecting surfaces being disposed with the focus of the conic section of each of their respective cross-sections intersected by a common line substantially parallel to the axes of said cylindrical surfaces and with a vertex of the conic section adjacent said focus of each of their respective conic sections intersected by an additional common line substantially parallel to the axes of said cylindrical surfaces, and a ribbon-shaped source of light for emitting light from the opposite surfaces thereof, said source of light being disposed adjacent to the common line with each of said opposite surfaces positioned to direct light toward said first and second reflecting surfaces, whereby each of said first and second reflecting surfaces are adapted to reflect a separate portion of the light from said source.

14. A lamp comprising a first reflecting surface which is in the form of a portion of a first concave cylindrical surface, the cross-section of said first reflecting surface perpendicular to the longitudinal axis of the first concave cylindrical surface substantially corresponding to a portion of a first conic section, a second reflecting surface disposed adjacent to said first reflecting surface and being in the form of a portion of a second concave cylindrical surface, the cross-section of said second reflecting surface perpendicular to the longitudinal axis of the second concave cylindrical surface substantially corresponding to a second conic section which is different from the first conic section, one of said conic sections being a parabola, said first and said second reflecting surfaces being disposed with the focus of the conic section of each of their respective cross-sections intersected by a common line substantially parallel to the axes of said cylindrical surfaces and with a vertex of the conic section adjacent said focus of each of their respective conic sections intersected by an additional common line substantially parallel to the axes of said cylindrical surfaces, and a ribbon-shaped source of light for emitting light from the opposite surfaces thereof, said source of light being disposed adjacent to the common line with each of said opposite surfaces positioned to direct light toward said first and second reflecting surfaces, whereby each of said first and second reflecting surfaces are adapted to reflect a separate portion of the light from said source.

15. A lamp comprising a first reflecting surface which is in the form of a portion of a first concave cylindrical surface, the cross-section of said first reflecting surface perpendicular to the longitudinal axis of the first concave cylindrical surface substantially corresponding to a portion of an elliptic conic section, a second reflecting surface disposed adjacent to said first reflecting surface and being in the form of a portion of a second concave cylindrical surface, the cross-section of said second reflecting surface perpendicular to the longitudinal axis of the second concave cylindrical surface substantially corresponding to a parabolic conic section, said first and said second reflecting surfaces being disposed with the focus of the conic section of each of their respective cross-sections intersected by a common line substantially parallel to the axes of said cylindrical surfaces, and with a vertex of the conic section adjacent said focus of each of their respective conic sections intersected by an additional common line substantially parallel to the axes of said cylindrical surfaces, and a ribbon-shaped source of light for emitting light from the opposite surfaces thereof, said source of light being disposed adjacent to the common line with each of said opposite surfaces positioned to direct light toward said first and second reflecting surfaces, whereby each of said first and second reflecting surfaces are adapted to reflect a separate portion of the light from said source.

16. A lamp comprising a first reflecting surface which is in the form of a portion of a first concave cylindrical surface, the cross-section of said first reflecting surface perpendicular to the longitudinal axis of the first concave cylindrical surface substantially corresponding to a portion of an elliptic conic section, a second reflecting surface disposed adjacent to said first reflecting surface and being in the form of a portion of a second concave cylindrical surface, the cross-section of said second reflecting surface perpendicular to the longitudinal axis of the second concave cylindrical surface substantially corresponding to a portion of an elliptic conic section, said first and said second reflecting surfaces being disposed with the focus of the conic section of each of their respective cross-sections intersected by a common line substantially parallel to the axes of said cylindrical surface and with a vertex of the conic section adjacent said focus of each of their respective conic sections intersected by an additional common line substantially parallel to the axes of said cylindrical surfaces, and a ribbon-shaped source of light for emitting light from the opposite surfaces thereof, said source of light being disposed adjacent to the common line with each of said opposite surfaces positioned to direct light toward said first and second reflecting surfaces, whereby each of said first and second reflecting surfaces are adapted to reflect a separate portion of the light from said source.

17. A lamp comprising a first reflecting surface which is in the form of a portion of a first concave cylindrical surface, the cross-section of said first reflecting surface perpendicular to the longitudinal axis of the first concave cylindrical surface substantially corresponding to a portion of a first conic section, a second reflecting surface disposed adjacent to said first reflecting surface and said second reflecting surface being in the form of a portion of a second concave cylindrical surface, the cross-section of said second reflecting surface perpendicular to the longitudinal axis of the second concave cylindrical surface, substantially corresponding to a second conic section which is different from the first conic section, said first and said second reflecting surfaces being disposed with the focus of the conic section of each of their respective cross-sections intersected by a common line substantially parallel to the axes of said cylindrical surfaces, and an elongated electrical gas discharge lamp having the longitudinal axis thereof disposed adjacent to the common line for directing light toward said first and second reflecting surfaces, whereby each of said first and second reflecting surfaces are adapted to reflect a separate portion of the light from said source.

18. A reflector for a lamp having an elongated source of light, said reflector comprising a first reflecting surface which is in the form of a portion of a first concave cylindrical surface, the cross-section of said first reflecting surface perpendicular to the longitudinal axis of the first concave cylindrical surface substantially corresponding to a portion of a first conic section and a second reflecting surface disposed adjacent to said first reflecting surface and being in the form of a portion of a second concave cylindrical surface, the cross-section of said second reflecting surface perpendicular to the longitudinal axis of the second concave cylindrical surface substantially corresponding to a portion of a second conic section which is different from the first conic section, said first and said second reflecting surfaces being disposed with the focus of the conic section of each of their respective cross-sections intersected by a common line substantially parallel to the axes of said cylindrical surfaces and with a vertex of the conic section adjacent said focus of each of their respective conic sections intersected by an additional common line substantially parallel to the axes of said cylindrical surfaces, whereby each of said first and second reflecting surfaces are adapted to reflect a separate portion of the light from an elongated source of light when the elongated source of light is disposed adjacent to the common line to direct light toward said first and second reflecting surfaces.

References Cited

UNITED STATES PATENTS

| 1,181,544 | 5/1916 | Rand | 240—41.35 |
| 1,275,120 | 8/1918 | Ballman et al. | 240—41.3 X |
| 1,625,946 | 4/1927 | Laird | 240—41.35 |
| 2,277,685 | 3/1942 | Bergstrom | 240—41.25 |
| 2,553,434 | 5/1951 | Bergmans et al. | 313—113 X |
| 2,883,571 | 4/1959 | Fridrich et al. | 313—222 X |
| 3,037,139 | 5/1962 | Myers | 313—113 |
| 3,174,067 | 3/1965 | Bahrs | 313—110 |

FOREIGN PATENTS 952,939    3/1964    Great Britain.

JAMES W. LAWRENCE, *Primary Examiner.*

P. C. DEMEO, *Assistant Examiner.*